Figure 1:
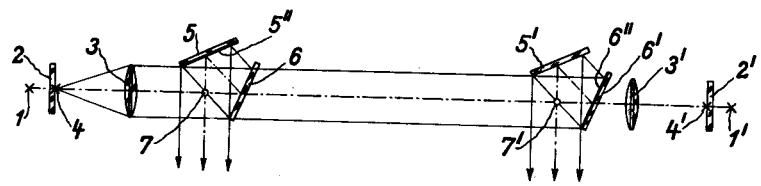

July 18, 1933.  O. EPPENSTEIN  1,918,527
RECTIFYING DEVICE FOR RANGE FINDERS
Filed March 22, 1932   2 Sheets-Sheet 1

Inventor:
Otto Eppenstein

July 18, 1933.    O. EPPENSTEIN    1,918,527
RECTIFYING DEVICE FOR RANGE FINDERS
Filed March 22, 1932    2 Sheets-Sheet 2

Inventor:
Otto Eppenstein

Patented July 18, 1933

1,918,527

UNITED STATES PATENT OFFICE

OTTO EPPENSTEIN, OF JENA, GERMANY, ASSIGNOR TO FIRM CARL ZEISS, OF JENA, GERMANY

RECTIFYING DEVICE FOR RANGE FINDERS

Application filed March 22, 1932, Serial No. 600,499, and in Germany March 28, 1931.

I have filed applications in Germany, March 28, 1931, and in Italy, January 18, 1932.

Rectifying devices for rangefinders have been used that are provided with two angular reflectors which, in two positions different with respect to each other, have reversely equal errors of reflectors. These reflectors reflect into the ray entrance apertures of the rangefinder rays of a common pencil of parallel light rays, which, accordingly, is to be divided. This division is effected in such a manner that each of the angular reflectors receives only one half of the pencil. When the light pencil is produced by means of a collimator, each of the angular reflectors receives only those rays which have traversed one of the two halves of the collimator lens. The consequence is measuring errors which are due to the fact that, owing to uncontrollable influences such as tensions, changes in temperature and the like, the two partial ray pencils, or the lines connecting the centres of gravity of the cross-section areas of these partial pencils, are practically not exactly parallel and that their inclination relative to each other has always the same angular value.

In the new rectifying device this disadvantage is eliminated by means of a ray division which is provided in such a way that, according to the invention, rays enter the two angular reflectors approximately from all parts of the cross section of the light pencil, so that each effective ray is divided into two partial rays each of which is deflected by one of the angular reflectors. In the literature of the art, the two fundamentally different kinds of ray division have been given short designations, the ray division applied in the known rectifying devices and the one in the object of the invention being termed geometrical division and physical division of the ray pencil, respectively.

The optical parts of the rectifying device, also the optical parts of the rangefinder itself are subject to the said uncontrollable influences. Tests have proved that the positions of the optical images in the rangefinder which are used for measuring generally differ from each other to an extent noticeably influencing the measuring accuracy when the images are produced by different partial ray pencils obtained by geometrically dividing the entering pencils of imaging rays, for instance by alternatively stopping down the one and the other half of the cross section of the entering ray pencil. The rangefinder is effectively rectified only when the entering rectifying ray pencils are given cross sections equal to those of the entering pencils of imaging rays. This condition obtains with sufficient perfection when the forms and dimensions of the cross sections of the ray pencils emanating from the angular reflectors of the rectifying device are equal to the forms and dimensions of the ray entrance apertures of the rangefinder.

It is in itself without any importance whether the angular reflectors of the rectifying device consist of simple plane reflectors in inclined positions or, what is about the same, whether these reflectors are triangular prisms with one lateral reflecting surface or whether they are provided by the known pentagonal prisms with two lateral reflecting surfaces or by pairs of plane reflectors arranged in the same manner as these lateral surfaces. As is well known, the said reflectors with two reflecting surfaces offer the advantage that the size of the angle of deviation of these reflectors is independent of the angle of incidence of the rays. In the construction of rangefinders, these reflectors are therefore given the preference, and also in the rectifying device they are preferred to reflectors with only one reflecting surface. With rangefinders of a comparatively great base length the use of angular reflectors each of which consists of two plano-parallel plates is especially advantageous. In this case, in order to avoid unnecessary losses of light, the plates are frequently provided with a reflecting layer, for instance a layer of silver. The plate for the ray division is, of course, not permitted to be light-tight; at best it is to be so silvered that on their way to the second angular reflector a reasonable part of the rays traverse this plate. If at most one each of the plates of the angular reflectors is provided with a reflecting layer, the rectifying device may be rigidly connected to the rangefinder, provided that care is taken that during the measuring process one unsilvered plate of each of the angular reflectors is in the ray path of the entering imaging rays, that is to say in front of each entrance aperture of the rangefinder. In the measuring process the imaging rays traverse the unsilvered plates of the angular reflectors and the consequent loss of light, which is comparatively small, is compensated for by the advantage that for rectifying purposes the rectifying device need not be brought in front of the entrance apertures of the rangefinder.

The pencil of rectifying rays can be produced in different manners. Use may be made for instance of the ray pencil emanating from a luminous point lying at a great distance. As is well known, a light pencil of parallel rays is generally provided by means of a collimator, that is to say by an appliance substantially consisting of a converging lens that has in its focus a light source or an illuminated mark. It is frequently the practice to bend the ray path within this collimator by means of a double deflection, in which case the axis is laterally displaced. This bending permits of making the collimator shorter, which is to be considered an advantage when the provision of the rectifying device is desired to increase as little as possible the length of the rangefinder in the sense of the direction of the base. The arising lateral ray displacement can be avoided by constructing the rectifying device in such a manner that the collimator rays traverse twice, in reverse senses, a reflecting surface of one system of angular reflectors. With rangefinders consisting of two telescope systems, the collimator lens may be dispensed with entirely because there is the possibility of using one telescope objective at the same time as a collimator lens.

Figure 2:
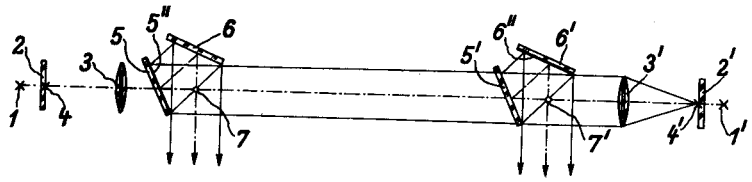
Figure 3:
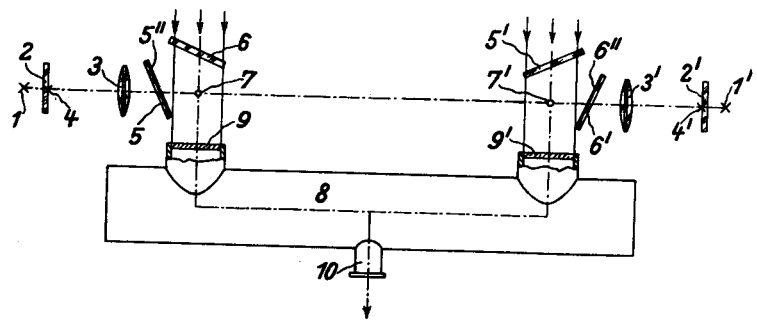
Figure 4:
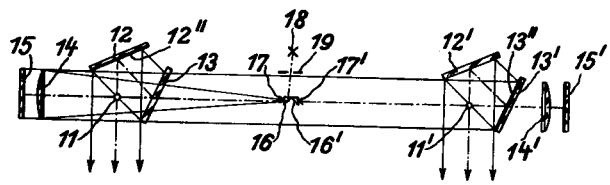
Figure 5:
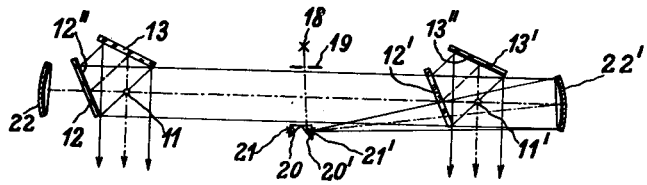
Figure 6:
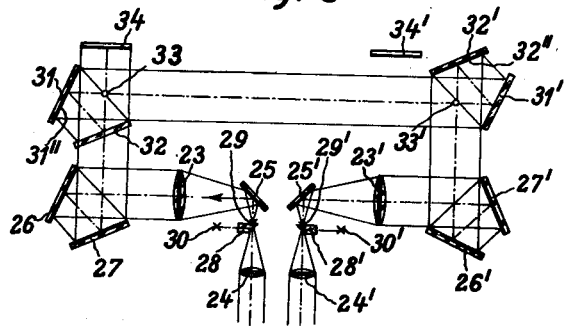
Figure 7:
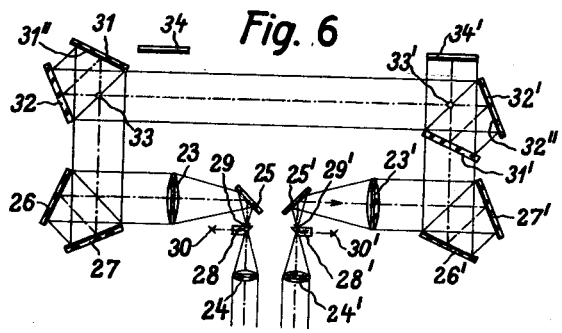
Figure 8:
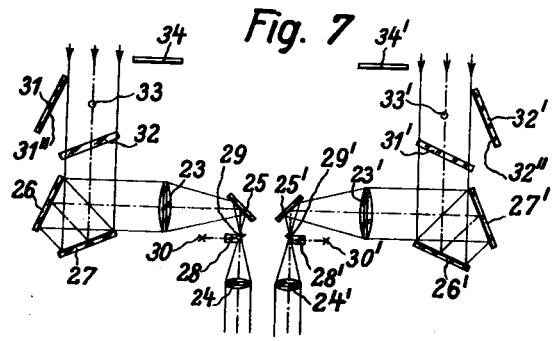

The accompanying drawings illustrate schematically, in plan views, four constructional examples of the invention. Figures 1 and 2 show the ray paths and the optical parts of the first example in the two positions required for effecting the rectification of the rangefinder, with reversely equal reflecting errors of the device. Figure 3 shows this example in connection with a coincidence rangefinder, this coincidence rangefinder being given the position in which the measurement of the distance can be effected. The ray paths and the optical parts of the second example are represented in Figure 4 in one rectifying position. Figure 5 illustrates the third example in which the ray paths and the optical parts are represented in the other rectifying position. Figure 5 illustrates the third example in which the ray paths and the optical parts are represented in the second rectifying position. The fourth example concerns a rectifying device which is rigidly connected to a stereoscopic rangefinder. Figures 6 and 7 represent the ray paths and the optical parts of the whole instrument in the two rectifying positions, respectively, while Figure 8 shows the ray paths and the said parts in the measuring position.

The rectifying device according to the first example (Figures 1 to 3) consists of two collimators with reversely directed coinciding axes and two angular reflectors provided in the ray paths of the said collimators. The collimators consist of light sources, 1, 1', frosted screens 2, 2', and converging lenses 3, 3', respectively. The points at which the collimator axes traverse the surfaces of the frosted screens 2, 2' are the foci of the converging lenses 3, 3'. These points are indicated by marks 4 and 4', respectively. The reflectors consist of two plano-parallel glass plates 5, 6 and 5', 6', respectively, which are inclined towards each other at an angle of 45°. The two glass plates 5 and 6 are provided with reflecting layers 5" and 6", respectively. The angular reflectors 5, 6 and 5', 6' are rotatable about vertical axes 7 and 7', respectively, which intersect the collimator axis at right angles. The distance at which the axes 7, 7' are from each other corresponds to the distance of the ray entrance apertures of a rangefinder 8 to be rectified. The ray entrance apertures are plano-parallel glass plates 9, 9'. The ocular tube of the rangefinder 8 is designated 10.

The rectifying process consists of two tests with differently inclined angular reflectors 5, 6 and 5', 6', from which, as is well known, an entering light ray emerges at an angle of 90° after reflexion on the two glass plates. In the rectifying positions, the corresponding glass plates 5 and 5' as well as 6 and 6' are parallel to each other. Proceeding from one rectifying position to the other is effected by turning the angular reflectors out of the positions represented in Figure 1 through right angles into the positions shown in Figure 2. For effecting a rectification, the device is provided in front of the range-finder 8 in the manner shown in Figure 3, the common collimator axis being parallel to the rangefinder base, and the axes of the imaging ray pencils entering through the glass plates 9, 9' intersecting at right angles the axes of rotation 7, 7'. In the first test process (Figure 1) the light source 1 illuminates the frosted screen 2 and, consequently, also the mark 4, which is imaged by the lens 3 at an infinitely great distance. The pencil of parallel light rays which consequently emanates from the lens 3 is partly reflected by the unsilvered glass plate 6 to the silver layer 5" of the plate 5 and, after having been deviated at a right angle, directed to the ray entrance aperture 9 of the rangefinder 8. That part of the pencil of light rays which is not reflected traverses the plate 6 and strikes the reflecting layer 6″ on the plate 6′. The plate 6′ deviates the rays to the plate 5′ which, in its turn, deflects them to the ray entrance aperture 9′ of the rangefinder 8. The plate 5′ not being silvered, part of the said rays naturally traverse this plate and are lost for the test process. In this process the light emanating from the light source 1′ is prevented by the reflecting layer 6″ from entering the angular reflectors 5, 6 and 5′, 6′, this light being effective only in the second test process (Figure 2). In this test process the light of the light source 1 is stopped down by the reflecting layer 5″ of the plate 5 and the pencil of light rays emitted by the light source 1′ strikes the two angular reflectors symmetrically to the path described with reference to the first test process and in reverse order. Accordingly, the plate 6 is substituted by the unsilvered plate 5 which now, represents the ray dividing system.

The rectifying process of the rangefinder itself, in which, in the first and second cases, the mark 4 and the mark 4′, respectively, are imaged once in each part of the field of view of the rangefinder, and in which the infinity point of the rangefinder scale is brought into coincidence with the coincidence positions of these two mark images may be assumed to be known. As the glass plates 5, 6 and 5′, 6′ of the angular reflectors are so chosen that the cross sections of the emanating pencils of light rays are equal in form and size to the entrance apertures 9, 9′ of the rangefinder and as the corresponding axes coincide, test errors due to different cross sections of the light passages of the optical parts cannot occur. As is well known, test errors which are due to wrong angles of the angular reflectors are found when using the rectifying device in two symmetric positions, as reversely equal errors of reflection and therefore can be avoided.

When after effected rectification of the rangefinder a measurement is to be made, the two angular reflectors are so adjusted that the positions of the plates 5, 6 correspond to the positions which these plates have in the second test process, and that the positions of the plates 5′, 6′ correspond to the positions these plates 5′, 6′ have in the first test process (Figure 3). In this manner the imaging rays emanating from the distant object to be measured and entering the ray entrance surfaces 9, 9′ strike only the unsilvered glass plates 6, 5′ of the angular reflectors which, with the exception of slight reflection losses, they traverse unobstructedly. The slight parallel displacements of the rays, which are due to the inclined positions of the plates 6, 5′ relative to the direction of the rays, are generally harmless. In the case that these displacements should disturb, they can be easily avoided in a well known manner.

The example shows that, parallel to the rangefinder base, the length of the rectifying device is greater than this measuring instrument itself. The second constructional example (Figure 4) does not have this disadvantage. In this example again two angular reflectors 12, 13 and 12′, 13′ are rotatable about two axes 11, 11′. These two reflectors are completely equal to the angular reflectors 5, 6 an 5′, 6′ also with respect to mutual positions, and have reflecting layers 12″ and 13″, respectively. Outside the angular reflectors, converging lenses 14 and plane reflectors 15, 15′ are provided in such a manner that their axes coincide and intersect at right angles the axes of rotation 11, 11′. In the middle, between the axes of rotation 11, 11′, are provided two small triangular prisms 16, 16′ whereof one edge surface each, which is frosted, is at right angles to the axes of the lenses 14, 14′, the points at which these axes intersect the said edge surfaces being indicated by marks 17, 17′, respectively. The other edge surfaces are in front of a light source 18 disposed laterally outside the ray path.

Between the light source 18 and the prisms 16, 16′ is disposed a diaphragm 19 which can be so displaced in the diaphragm plane into two positions that it makes the light rays go either to the one or to the other of the said two prisms.

In the first test process, the ray paths of which are represented in the drawings, the diaphragm 19 must be given such a position that the prism 16 is illuminated. The collimator rays emanating from the mark 17 traverse the plate 13 and enter the lens 14. When having left this lens 14 they are deflected by the reflector 15. The lens 14 is given such a focal length that, after having traversed it twice, the originally diverging ray pencil is made a pencil of parallel rays striking the plate 13 a second time and this in a reverse sense. The further path of the ray pencil equals the one described with reference to the first example. A small part of the ray pencil directed to the second system of angular reflectors 12′, 13′ is stopped down by the prisms 16, 16′ lying in the ray path and is therefore lost. When proceeding to the second test process, the angular reflectors 12, 13 and 12′, 13′ are to be turned through right angles into the position corresponding to the one illustrated in Figure 2 with reference to the first example. Moreover, the diaphragm 19 is to be displaced into the other position, in which the prism 16′ and the mark 17′ are illuminated by the light source 18. In this test process the ray paths are again symmetrical to that of the first test process. The lens 14′ and the reflector 15′ are substituted for the lens 14 and the reflector 15, respectively. The unsilvered glass plate 12′ of the second of angular reflector is traversed by the collimator rays twice in reverse senses. In all other respects the rectifying process is the same as described.

The third constructional example (Figure 5) equals the second example with the exception that instead of the prisms 16, 16′ prisms 20, 20′ with frosted edge surfaces having marks 21 and 21′, respectively, are used outside the path of the rectifying rays and that the lenses 14, 14′ and the appertaining plane reflectors 15, 15′ are combined to concave reflectors 22 and 22′, respectively, of the same effect. The axes of these concave reflectors 22, 22′ are inclined in the correct manner with respect to the line connecting the two axes of rotation 11, 11′, thus causing the rays that emanate from the marks 21, 21′ to be deflected into the direction of the said connection line. The rectifying process, of which the drawing represents the second test process with respect to the positions of the diaphragm 19, the angular reflectors 12, 13 and 12′, 13′ and the ray paths, corresponds to the rectifying process described with reference to the second example.

With respect to the fourth constructional example (Figures 6 to 8), the drawings represent, in addition to the optical device and the paths of the rays within the rectifying device, the optical equipment and the ray paths in the rangefinder to be rectified, which is a stereoscopic rangefinder. For the sake of simplicity, the rangefinding device proper, which may consist in the well known manner of a displaceable or a turning wedge or a similar appliance, is not represented in the drawing. The rangefinder consists of a double telescope having objectives 23, 23′ and oculars 24, 24′. Reflectors 25, 25′ are provided for deviating the paths of the imaging rays within the telescopes, and angular reflectors are disposed in front of the objectives 23, 23′, these angular reflectors consisting of two silvered glass plates 26, 27 and 26′, 27′, respectively. In the ray path of the telescopes, trapeziform prisms 28, 28′ are provided in such a manner that the longer of the parallel edge surfaces, which are frosted and have optical marks 29, 29′, respectively, indicating the optical axes, lie in the focal planes of the oculars 24, 24′. Near the prisms 28, 28′ are provided light sources 30 and 30′, respectively. The rectifying device consists of two collimators, two angular reflectors and two plane reflectors. The collimators consist of light sources 30 and 30′, of marks 29 and 29′, and of objectives 23 and 23′, respectively, the objectives 23 and 23′ at the same time belonging to the double telescope. The angular reflectors, which are disposed in front of the angular reflectors 26, 27 and 26′, 27′, respectively, of the rangefinder, consist of two plano-parallel glass plates 31, 32 and 31′, 32′, respectively, which are rotatable about axes 33, 33′ intersecting at right angles the axes of the pencils of imaging rays which enter the angular reflectors 26, 27 and 26′, 27′, the connection lines of the axes 33, 33′ being parallel to the rangefinder base. The glass plates 31 and 32′ are provided with reflecting layers 31″ and 32″, respectively. The angular reflectors 31, 32 and 31′, 32′ are coordinated to plane reflectors 34 and 34′, respectively. These plane reflectors 34, 34′, which are at right angles to the axes of the imaging ray pencils entering the angular reflectors 26, 27 and 26′, 27′, respectively, can be displaced in their plane into two positions. In one of these two positions the plane reflectors 34, 34′ cover the cross sections of the said entering pencils of imaging rays, in the other of the said positions they are outside these ray pencils.

In the first test process (Figure 6), the collimator 30, 29, 23 is to be used. The light source 30′ therefore must be switched off. The collimator rays emanating from the illuminated mark 29 are made by the objective 23 to a pencil of parallel rays which is deviated in the known manner at a right angle into the angular reflector 26, 27. The angular reflector 31, 32 is to be so turned about its axis 33 that the exterior surface of the plate 32 is struck by the deviated collimator rays. The rays traverse this plate 32 and are reflected into themselves by the plane reflector 34 which is to be displaced into the ray path. These rays are now deflected on the interior surface of the glass plate 32 and, after another deflection on the reflecting layer 31″ of the plate 31, they are directed to the other angular reflector of the rectifying device, that is to say in so far as they do not traverse the plate 32 in the reverse sense and, reversely to their former direction, are united in the image plane of the ocular 24 to an image of the mark 29. The plane reflector 34′ is to be so displaced that it is outside the ray path. The rays deflected by the layer 31″ enter the angular reflector 31′, 32′ which is to be turned in such a way about its axis 33′ that the unsilvered plate 31′ is struck first. When leaving this angular reflector, the rays are deflected at right angles and, after having been deflected twice in the angular reflector 26′, 27′, they arrive at the objective 23′ which collects them in the image plane of the ocular 24′ to an image of the mark 29. The observer looking into the oculars 24, 24′ of the instrument sees the two mark images as one stereoscopic image of the mark 29, according to which the rangefinding device of the rangefinder is to be rectified in the known manner.

When proceeding to the second test process, the light source 30′, and not the light source 30, is switched on, the angular reflectors 31, 32 and 31′, 32′ are turned through right angles into the positions shown in Figure 7, and, instead of the plane reflector 34, the plane reflector 34' is brought into the corresponding ray path. The mark 29' illuminated by the light source 30' and the objective 23 now represent the collimator. The path of the rays, now symmetrical to the one in the first test process with respect to the plane at right angles to the middle of the base, is readily understood when reference is had to the drawing. Two images of the mark 29' arise in the image planes of the oculars 24, 24', and the observer has to combine these images to a stereoscopic image which he makes use of in rectifying the rangefinding device.

In the measuring process with the rangefinder, the two plane reflectors 34, 34' are displaced out of the ray path, and the angular reflectors 31, 32 and 31', 32' are turned about their axes 33, 33' into those positions which, with the first mentioned angular reflector, correspond to the first test position, and with the other angular reflector correspond to the second test position. The imaging rays emanating from the distant object to be measured traverse the unsilvered glass plates 32 and 31' of these angular reflectors and enter the angular reflectors 26, 27 and 26', 27' and, consequently, the rangefinder, by means of which the measurement is effected in the well-known manner.

I claim:

1. A rectifying device for range finders, comprising two angular reflectors, these anbular reflectors being so constructed as to direct to the entrance apertures of a rangefinder rays of a common pencil of parallel light rays, at least one reflecting surface of each of the said angular reflectors partly reflecting, and partly being traversed by, each light ray striking it.

2. In a rectifying device according to claim 1, each of the two angular reflectors consisting of two plano-parallel plates, at least one plate of each of the said reflectors partly reflecting, and partly being traversed by, each light ray striking it.

OTTO EPPENSTEIN.